United States Patent
Nathan

(10) Patent No.: US 7,841,663 B2
(45) Date of Patent: Nov. 30, 2010

(54) VEHICLE SEAT LUMBAR SYSTEM

(75) Inventor: John F. Nathan, Highland Township, MI (US)

(73) Assignee: Lear Corporation, Southfield, MI (US)

( * ) Notice: Subject to any disclaimer, the term of this patent is extended or adjusted under 35 U.S.C. 154(b) by 105 days.

(21) Appl. No.: 12/243,485

(22) Filed: Oct. 1, 2008

(65) Prior Publication Data

US 2010/0078974 A1   Apr. 1, 2010

(51) Int. Cl.
*A47C 3/00*   (2006.01)
(52) U.S. Cl. .................. 297/284.7; 297/248.8
(58) Field of Classification Search .......... 297/284.4, 297/284.1, 217.3, 284.6, 248.8, 284.7; 701/49
See application file for complete search history.

(56) References Cited

U.S. PATENT DOCUMENTS

| | | | |
|---|---|---|---|
| 4,634,179 A | 1/1987 | Hashimoto et al. | |
| 5,197,780 A | 3/1993 | Coughlin | |
| 5,283,735 A | 2/1994 | Gross et al. | |
| 5,562,324 A | 10/1996 | Massara et al. | |
| 5,758,924 A | 6/1998 | Vishey | |
| 6,007,151 A | 12/1999 | Benson | |
| 6,015,163 A | 1/2000 | Langford et al. | |
| 6,058,341 A * | 5/2000 | Myers et al. | 701/45 |
| 6,501,465 B2 | 12/2002 | Sandbach | |
| 6,714,117 B2 | 3/2004 | Sandbach | |
| 6,737,953 B2 | 5/2004 | Serban et al. | |
| 7,145,432 B2 | 12/2006 | Lussey et al. | |
| 2005/0052426 A1 | 3/2005 | Hagermoser et al. | |
| 2005/0093353 A1* | 5/2005 | Schussler et al. | 297/284.4 |
| 2006/0244293 A1* | 11/2006 | Buffa | 297/284.4 |
| 2007/0108816 A1 | 5/2007 | McQueen et al. | |
| 2007/0132296 A1 | 6/2007 | Sturt et al. | |

* cited by examiner

*Primary Examiner*—Milton Nelson, Jr.
(74) *Attorney, Agent, or Firm*—MacMillan, Sobanski & Todd, LLC

(57) ABSTRACT

A seat assembly includes a seat defining an outer seating surface. An adjustment mechanism is mounted on the seat and includes a member movable relative to the seating surface for altering the contoured shape of the seating surface. A sensor is mounted on the seat. The sensor detects the location of an applied force acting on the seating surface by an occupant seated on the seat back and detects an applied pressure distribution of the force exerted on the seating surface. The sensor supplies a signal indicative of the location of the applied force and the applied pressure distribution of the force. A controller receives the signal and is operable by a seat occupant for storing information corresponding to the location of the applied force and the applied pressure distribution of the force. The controller is operable to move the member by the adjustment mechanism from an initial position to a subsequent position dependent on a subsequent detection of a location of a second applied force and an applied pressure distribution of the force detected by the sensor.

11 Claims, 2 Drawing Sheets

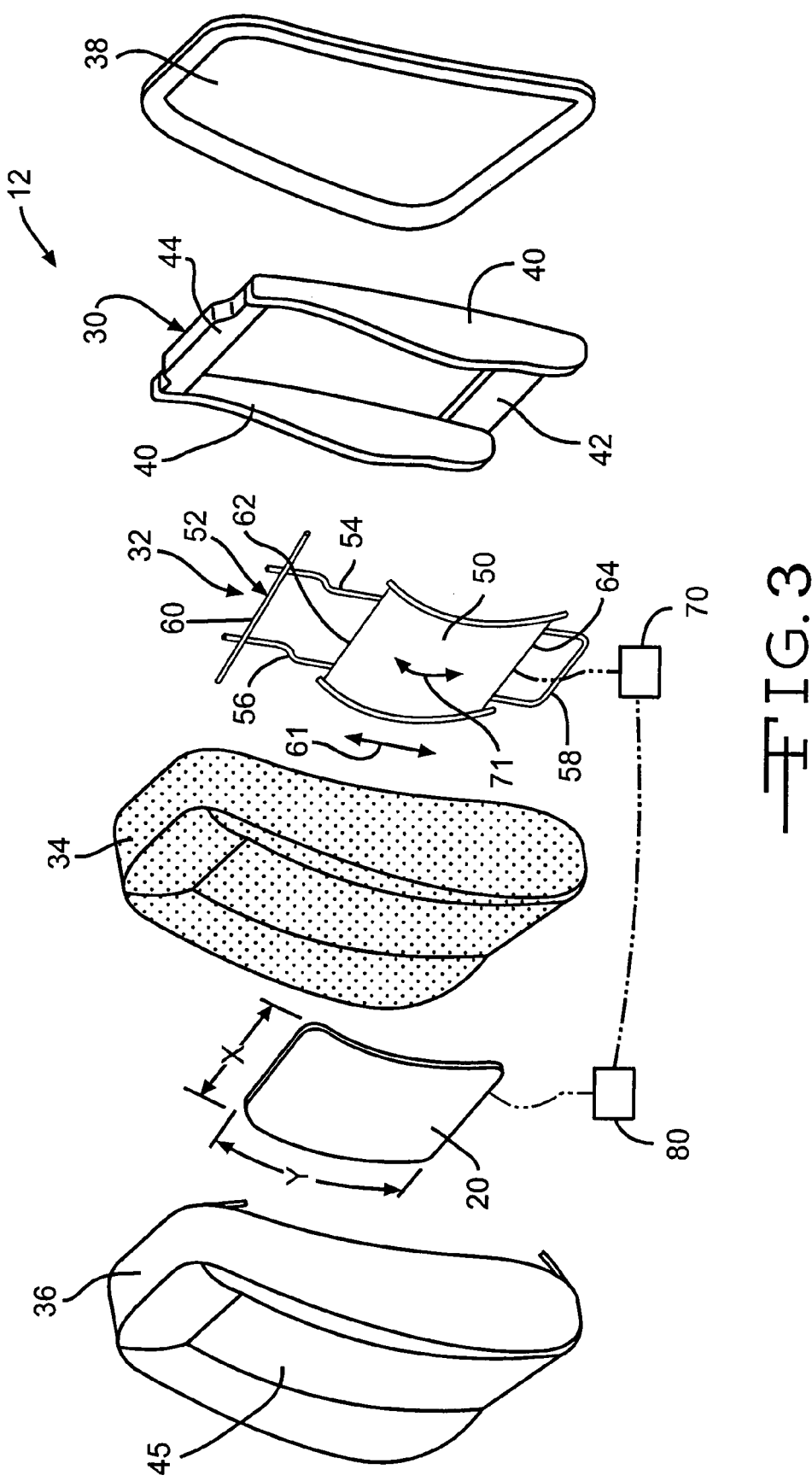

VEHICLE SEAT LUMBAR SYSTEM

BACKGROUND OF THE INVENTION

This invention relates in general to vehicle seats, and in particular to vehicle seats having adjustable lumbar systems. Vehicle seats typically include a seat back and a seat cushion or bottom. The seat back is often pivotally mounted to the seat bottom via a recliner mechanism for adjusting the seat back to a desired inclined angle relative to the seat bottom. Known recliner mechanisms are either manually operated or may include a motor drive unit for electric operation. The seat bottom may also be configured to move the seat in fore and aft directions as well as in a generally vertical direction. Other comfort features include a lumbar mechanism mounted in the seat back. The lumbar mechanism is operated by the seat occupant to adjust the shape and contour of a portion of the seat back to provide a desired support level and comfort position for the seat occupant. Generally, the lumbar mechanisms are provided for altering the contour of a central region of the seat back. The lumbar mechanisms are generally mounted underneath the outer trim cover and foam pads of the seat back. Some lumbar mechanisms provide a fore and aft adjustment, as well as vertical adjustment of the lumbar mechanism.

Known lumbar mechanisms include mechanical systems and inflatable systems. An example of a mechanical system uses deflectable or bowed members generally having a curved shape. To adjust the fore and aft position, the members can be moved outwardly or inwardly relative to the central region of the seat back. Such a lumbar mechanism is disclosed in U.S. Patent Application Publication No. 2007/0132296. Additionally, the bowed members may be moved in a generally vertical direction along the height of the seat back. Inflatable systems can be pneumatic or hydraulic and use one or more inflatable bladders mounted underneath the trim cover and the foam pads of the seat back to function as an adjustable lumbar mechanism. Such a system is disclosed in U.S. Pat. No. 5,562,234. To alter the contour of the seat back, one or more of the bladders are selectably expanded or contracted to provide the desired contoured shape of the seat back.

It is also known to provide either mechanical or inflatable lumbar systems with memory systems for storing and retrieving desired lumbar positions. The seat occupant moves the lumbar mechanism to a desired position and operates a control device for storing information regarding the current position of the components of the lumbar mechanism. The control device is a microprocessor which stores and retrieves this positional information. If the lumbar mechanism has been moved from this preferred stored position, the seat occupant need only to operate the controller to select the stored memory position and the controller will automatically operate the lumbar mechanism until the respective components are back at that desired stored position. For example, in the mechanical lumbar systems, the control device stores information regarding the position of the bowed lumbar member relative to fixed structures within the seat back. For inflatable systems, a pressure sensor is often used to store the desired pressure within each of the bladders. The controller can than operate various valves and pumps or fluid devices to set the internal pressure of the bladders at the selected pressure. Although these memory systems are helpful, they do not account for temperature or wear variations over time of the outer trim cover and the foam of the seat back.

SUMMARY OF THE INVENTION

This invention relates to a seat assembly including a seat defining an outer seating surface. An adjustment mechanism is mounted on the seat and includes a member movable relative to the seating surface for altering the contoured shape of the seating surface. A sensor is mounted on the seat. The sensor detects the location of an applied force acting on the seating surface by an occupant seated on the seat back and detects an applied pressure distribution of the force exerted on the seating surface. The sensor supplies a signal indicative of the location of the applied force and the applied pressure distribution of the force. A controller receives the signal and is operable by a seat occupant for storing information corresponding to the location of the applied force and the applied pressure distribution of the force. The controller is operable to move the member by the adjustment mechanism from an initial position to a subsequent position dependent on a subsequent detection of a location of a second applied force and an applied pressure distribution of the force detected by the sensor.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a schematic cross-sectional view taken along lines 3-3 of FIG. 1.

DETAILED DESCRIPTION OF THE PREFERRED EMBODIMENT

Figure 1:
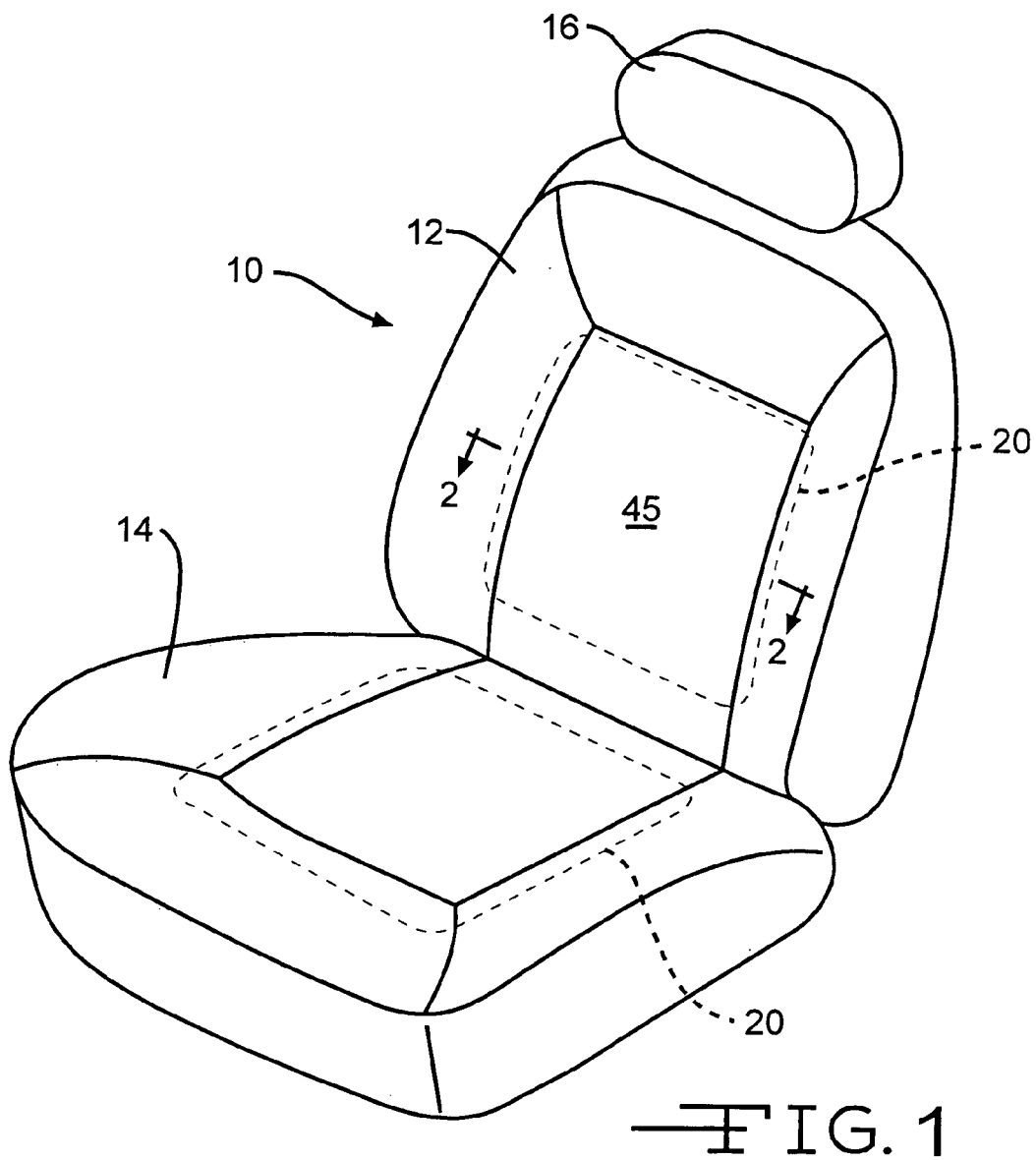
FIG. 1 is a schematic perspective view of a seat assembly.

Referring now to the drawings, there is schematically illustrated in FIG. 1 a vehicle seat assembly, indicated generally at 10. The seat assembly 10 generally includes a seat back 12 and a seat bottom 14. The seat back 12 may be pivotally mounted to the seat bottom 14 via a recliner mechanism (not shown) for adjusting the seat back 12 to a desired inclined angle relative to the seat bottom 14. The recliner mechanism may be operated manually by a handle or may include a motor drive unit (not shown) for electric operation. The seat bottom 14 may be configured to move the seat assembly 10 in fore and aft directions as well as in a generally vertical direction relative to the vehicle floor upon which the seat assembly 10 is mounted. The seat assembly 10 may further include a headrest 16 attached to an upper portion of the seat back 12. The headrest 16 may be moveably mounted on the seat back 12. As shown in FIG. 1, the seat assembly 10 may include one or more sensor pad assemblies 20, the reason for which will be explained below. The sensor pad assemblies 20 may be mounted in the seat back 12 and/or the seat bottom 14. A sensor pad assembly may also be mounted in the headrest 16 although such is not shown in FIG. 1.

There is illustrated in FIG. 3 a schematic exploded view of an embodiment of the seat back 12 of FIG. 1. The seat back 12 generally includes a frame 30, a lumbar adjustment mechanism 32, a foam pad 34, a sensor pad assembly 20, a trim cover 36, and an optional back cover 38. The frame 30 is a relative rigid structure and can be configured in any suitable manner which provides for a rigid framework. In the embodiment shown in FIG. 2, the frame 30 includes a pair of generally vertical side members 40, a lower cross member 42, and an upper cross member 44. The headrest 16 can be fixedly or movably mounted on the upper cross member 44. The frame 30 can be made of rigid materials such as metal or composites. If desired, the rear or back end of the seat back 12 can be covered by the back cover 38. The back cover 38 can be made of any material such as plastic, and may have any desired shape. Alternatively, the back cover 38 may not be included and the back end of the seat back 12 may be covered by the trim cover 36 or another trim cover material.

The front portion of the seat back 12 is covered by the foam pad 34 and can have any suitable contoured shape suitable for supporting an occupant seated on the seat assembly 10. The foam pad 34 can be made of any suitable material, such as polymer foam or other types of padding material. The foam pad 34 generally provides for a cushioned padding for the occupant of the seat and generally defines the contoured seating surface. The foam pad 34 is covered by the trim cover 36 which defines an outer seating surface 45 for the seat back 12. The trim cover 36 can be made from a variety of suitable materials, such as cloth, vinyl, and leather. The trim cover 36 can be made from a plurality of portions which are sewn together to form the trim cover 36. If desired, an additional layer of foam material (not shown) can be disposed between the trim cover 36 and the foam pad 34. This additional layer of foam material may be a thin layer which is softer or less dense than the material of the foam pad 34 to provide a relatively soft feel immediately underneath the trim cover 36.

Figure 2:
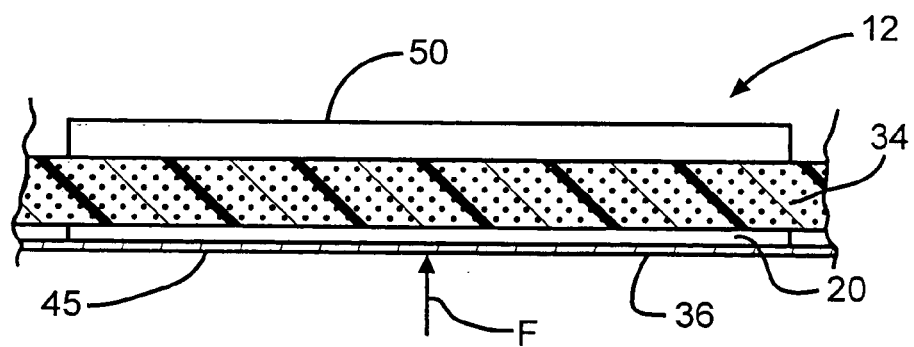
FIG. 2 is a schematic exploded perspective view of a seat back portion of the seat assembly of FIG. 1.

The lumbar mechanism 32, as schematically shown in FIG. 2, is illustrated as a mechanical-type lumbar system. The lumbar mechanism 32 is operable to adjust the contour of a central portion of the seat back 12 to provide a desired support level and comfort position for the seat occupant. Although the lumbar mechanism 32 is shown and described as being used for altering the contour of a central region of the seat back 12 it should be understood that the mechanism 32 can be configured and repositioned to alter any portion of the seat back 12. The lumbar mechanism 12 is generally mounted underneath the outer trim cover 36 and the foam pad 34 of the seat back 12. However, the lumbar mechanism can be mounted at other suitable locations, such as between the trim cover 36 and the foam pad 34. The lumbar mechanism 32 includes a support member 50 which is movable relative to a mounting bracket 52 attached to the frame 30 of the seat back 12. The support member 50 can be any suitable structure and have any desired shape which provides for support for the seat occupant. In one embodiment, the support member 50 has a bowed curvilinear shape, as shown in FIG. 3. The support member 50 may be formed from a plastic sheet having a curvilinear cross-sectional shape. The support member 50 may also be formed from a single structure or may include a plurality of interconnected members. The support member 50 may have a convex shape, as shown in FIG. 3, such that a central portion of the support member extends forward or towards the seating surface 45 of the seat back 12. This shape has generally been found to provide suitable and comfortable support for the back of a seat occupant.

In the schematic embodiment shown in FIG. 3, the mounting bracket 52 of the lumbar mechanism 32 includes a pair of generally vertical side members 54 and 56, a lower cross member 58 and an upper cross member 60. The lower cross member 58 is attached to the lower cross member 42 of the frame 30. Ends of the upper cross member 60 are attached to upper portions of the side members 40 of the frame 30.

The support member 50 may be movably mounted on the mounting bracket 52 via an actuator, indicated generally at 70. The support member 50 may be movably mounted on the mounting bracket 52 such that the support member 50 may move in a generally vertical direction, as indicated by arrows 61. For example, an upper end 62 and a lower end 64 of the support member 50 may be slidably mounted on the side members 54 and 56 of the mounting bracket 52. The actuator 70 can be a manually operated device for moving the support member 50 relative to the mounting bracket 52. For example, the actuator 70 may include a hand operated lever (not shown) which operates a Bowden cable (not shown) connected to the support member 50. Actuation of the Bowden cable will cause the support member 50 to slide relative to the mounting bracket 52. The support member 50 can move downwardly or upwardly depending on the actuation of the Bowden cable. If desired, a spring (not shown) may be used to assist in moving the support member 50. Alternatively, the actuator 70 may include an electrically powered device having a motor for powered movement of the support member 50 relative to the mounting bracket 52.

Additionally or in the alternative, the actuator 70 may also move the support member 50 or portions of the support member 50 in fore and aft directions relative to the mounting bracket 52. One suitable way to provide this fore and aft movement is to alter the degree of curvature of the support member 50 as indicated by arrows 71. Expanding the support member 50 to a more bowed concave shape moves a central portion of the support member in a forward direction towards the seating surface 45. Changing the shape of the support member to a less bowed shape provides an aft directional movement of the central portion of the support member 50. The actuator 70 can be manually operated or electrically powered to provide the fore and aft movement. As described above, the actuator 70 may include a hand operated lever (not shown) which operates a Bowden cable (not shown) connected between the upper end 62 and the lower end 64 of the support member 50. The cable can be actuated to pull or push one end 62 and 64 relative to the other end 64 and 62 causing a change in the curvature of the support member 50. Alternatively, the actuator 70 may include an electrically powered device having a motor for powered movement of the ends 62 and 64 of the support member 50 relative to each other.

As stated above, the seat assembly 10 includes at least one sensor pad assemblies 20. For explanation purposes, only a single sensor pad 20, as shown in FIG. 3, located on the seat back 12 will described for operation of the system. However, it should be understood that multiple sensor pads 20 may be mounted and used with the seat back 12. Although the sensor pad 20 is shown as separate structure, the sensor pad 20 may be integrally stitched or formed in portions of the seat back, such as the trim cover 36 or foam pad 34. The sensor pad assembly 20 is preferably a flexible relatively flat structure or sheet which can flex corresponding to the shape of the support member 50 during movement thereof. The sensor pad assembly 20 detects a force or pressure distribution acting on the sensor pad assembly 20 from the seated occupant. The sensor pad assembly 20 preferably is capable of detecting the position of forces acting thereon. For example, the sensor pad assembly 20 preferably can detect the two dimensional position relative to a dimensional width X and a dimensional height Y, as shown in FIG. 3, of forces acting thereon. Furthermore, the sensor pad assembly 20 is preferably capable of detecting the amount of force or the pressure distribution of the forces acting thereon. Thus, the sensor pad assembly 20 preferably is capable of detecting the applied force, the applied pressure, area of contact and/or orientation of an object pushed against the sensor pad assembly 20. The sensor pad assembly 20 can, therefore, interact indirectly with parts of a human body, e.g., the back of a seat occupant, to determine the position and pressure distribution that the back with acts on the sensor pad assembly 20. The sensor pad assembly 20 may communicate wirelessly or by wired connection with a controller 80 which receives signals from the sensor pad assembly 20 corresponding to position and pressure distributions acting on the sensor pad assembly 20.

The sensor pad assembly 20 may be made of any suitable components which enable the sensor pad assembly 20 to detect the positional and pressure distribution of forces acting thereon. Such a suitable sensor assembly which may be used for the sensor pad assembly 20 is described in U.S. Pat. Nos. 6,501,465 and 6,714,117, both of which are incorporated by reference herein. For example, the sensor pad assembly 20 may be made of fabric having electrically conductive elements, wherein an electrical potential is applied to the electrically conducting elements to determine the applied force, the applied pressure, area of contact and/or orientation of an object pushed against the sensor pad assembly 20. More particularly, the sensor pad assembly 50 may be a flexible planar detector that can be mounted behind the outer trim cover and/or foam padding of the seat back. The sensor pad assembly 20 can have conductive outer layers of fabric, separated by an insulating layer. The insulating layer preferably has an open structure and helps to prevent electrical contact between the outer layers, except at positions of mechanical interaction. Pressing on the sensor pad assembly 20 at a location of force presses the outer layers against one another. The layers are thus pressed into intimate contact and due to the open structure of the insulating layer, the outer layers come into contact with each other. By applying electrical potential gradients across the outer layers and measuring the electrical potential of outer layers, the location of the mechanical interaction may be determined. In addition, by measuring the current flowing to the outer layers, an indication of the size of force, or, alternatively, the area over which it applies a pressure to the sensor, may be determined.

The seat assembly 10 preferably includes a memory system such that the seat occupant can select a desired setting of the support member 50 corresponding to positional and pressure distribution of reactionary forces acting on the back of the seat occupant. Unlike conventional lumbar memory systems which merely store the positional information of the physical location of the support member, the memory system of the present invention will move the support member 50 until a desired positional and pressure distribution of forces is reached as detected by the sensor pad assembly 20. Thus, the support member 50 is not merely moved to a desired physical location and position, but the support member 50 is moved to a position corresponding to desired reactionary force or pressure gradient acting on the back of the seat occupant.

The operation of such as memory system will now be described. The seat occupant preferably moves the support member 50 via the actuator 70 to a desired position thus altering the contoured seating surface 45. This desired position may correspond to a position in which the occupant feels a desired reactionary force against the back of the occupant. This reactionary force depends not only on the position of the support member 50 relative to the seat frame 30, but other factors such as the condition of the foam pad, which may change over time, the position of the occupant on the seat 10, and what articles of clothing the occupant is wearing, i.e. a heavy coat versus no coat. After the seat occupant has positioned the support member 50 to obtain a desired positional and pressure distribution of reactionary forces, the signals from the sensor pad assembly 20 relating to this positional and pressure distribution of forces acting on the sensor pad assembly 20 are stored in the controller 80. The memory system can then be activated to continuously monitor the force and pressure distribution signals from the sensor pad assembly 20 and automatically move the support member 50 via the actuator 70 when the detected force and pressure distribution is outside a predetermined range from the initial stored readings. Thus, the controller 80 may be operable to move the support member 50 by the adjustment mechanism 32 from an initial selected memory position to a subsequent position dependent on a subsequent detection of a location of a second applied force and an applied pressure distribution of the force detected by the sensor pad assembly 20. The support member 50 need not be moved to a subsequent position so as to exactly duplicate the initial reading of location and pressure distribution but may moved until readings are within a predetermined range. The controller may use pattern recognition to determine if the subsequent readings are within the predetermined range. An example of this use of control is when a seat occupant repositions themselves in the seat 10 such as by physically moving relative to the seat or moving the seat itself in different reclined or fore and aft position relative to the vehicle floor. The controller 80 of the memory system will monitor and accordingly move the support member 50 to a position corresponding to the desired force and pressure distribution. This system is unlike conventional lumbar memory systems which simply physically position the support member back to a stored location once it has been moved from its stored position.

Additionally or alternatively, the memory system of the present invention may move the support member 50 to a desired force and pressure distribution setting after the seat occupant selects a user input control. For example, the memory system may include an input switch (not shown) for storing the desired memory settings of the force and pressure distributions. The memory system may then include a second input switch (not shown) which is selected by the seat occupant when the seat occupant wants to engage the memory system. Alternatively, the controller 80 may be configured to store information for multiple seat occupants and the second input switch may be automatically selected such as when one of a plurality of keyless entry key fobs is operated.

One of the advantages of the memory system described above is that the memory settings selected by the seat occupant are based on the feel or pressure acting on the occupant and not directly on the amount of deflection or location of the support member 50. Thus, the present invention can accommodate changes in the condition of the seat 10 such as if the foam density or other wear properties of the seat 10 change over a period of time or temperature. Also, the memory system can accommodate the changes of the seat occupant's clothes such as when the seat occupant stores the memory setting when the seat occupant is wearing a light shirt but later is wearing a heavy padded coat.

It should be understood that the seat bottom 14 may be configured in a similar manner as the seat back 12 described above and shown in FIG. 3. Although the support member 50 has been shown and described as a movable contoured resilient member, the adjustment mechanism 32 could be configured differently, such as by using a plurality of inflatable bladders mounted under the seating surface 45. It should also be understood that the sensor pad assembly 20 may also be used for other reasons, such as for example a sensor for an occupant detection system of an air bag deployment system.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A seat assembly comprising:
a seat defining a seating surface;
an adjustment mechanism mounted on said seat and including a member movable relative to said seating surface for altering a shape of said seating surface;
a sensor mounted on said seat, said sensor detecting a location of an applied force acting on said seating surface by an occupant when seated on said seat and detecting an applied pressure distribution of the force exerted on said seating surface, wherein said sensor supplies a signal indicative of the location of the applied force and the applied pressure distribution of the force; and
a controller receiving said signal and operable by a seat occupant for storing information corresponding to the location of the applied force and the applied pressure distribution of the force, wherein said controller is operable to move said member by said adjustment mechanism from an initial position to a subsequent position dependent on a subsequent detection of a location of a second applied force and a second applied pressure distribution of the second applied force detected by said sensor.

2. The seat assembly of claim 1, wherein said seat assembly includes a foam pad and a trim cover defining said seating surface, and wherein said sensor is disposed between said foam pad and said trim cover.

3. The seat assembly of claim 2, wherein said sensor is a flexible pad.

4. The seat assembly of claim 3, wherein said flexible pad is separate from said foam pad and said trim cover.

5. The seat assembly of claim 1, wherein said member of said adjustment mechanism has a curvilinear shape.

6. The seat assembly of claim 5, wherein said member is formed from a plastic sheet.

7. The seat assembly of claim 1, wherein said adjustment mechanism includes a mounting bracket attached to a frame of said seat, and wherein said member is movably mounted on said mounting bracket.

8. The seat assembly of claim 7, wherein said member is slidably mounted on said mounting bracket.

9. The seat assembly of claim 7, wherein said member is mounted on said mounting bracket such that said member can be bowed.

10. A seat assembly comprising:
a seat including a foam pad and a trim cover defining a seating surface;
an adjustment mechanism mounted on said seat and including a member movable relative to said seating surface for altering a shape of said seating surface;
a flexible sensor pad mounted on said seat and disposed between said foam pad and said trim cover, said sensor pad detecting the location of an applied force acting on said seating surface by an occupant when seated on said seat and detecting an applied pressure distribution of the force exerted on said seating surface, wherein said sensor pad supplies a signal indicative of the location of the applied force and the applied pressure distribution of the force; and
a controller receiving said signal and operable by a seat occupant for storing information corresponding to the location of the applied force and the applied pressure distribution of the force, wherein said controller is operable to move said member by said adjustment mechanism from an initial position to a subsequent position dependent on a subsequent detection of a location of a second applied force and a second applied pressure distribution of the second applied force detected by said sensor pad.

11. A seat assembly comprising:
a seat defining a seating surface;
a member that is movable relative to said seating surface for altering a shape of said seating surface;
a sensor that is adapted to generate a signal that is representative of an applied pressure distribution of a force exerted on said seating surface; and
a controller that is responsive to the sensor signal for selectively storing information corresponding to the applied pressure distribution of the force and that is operable to move said member from an initial position to a subsequent position dependent on a subsequent second applied pressure distribution of a second force exerted on said seating surface and detected by said sensor.

* * * * *